US009302708B2

(12) United States Patent
Ingels et al.

(10) Patent No.: US 9,302,708 B2
(45) Date of Patent: Apr. 5, 2016

(54) SUPPORT MEMBER FOR A TRAILER

(71) Applicant: XL Specialized Trailers, Inc., Manchester, IA (US)

(72) Inventors: Jeffrey Wilcox Ingels, Maynard, IA (US); Matthew Martin Schattgen, Strawberry Point, IA (US); Shannon Brooke Richardson, Earlville, IA (US); Joshua Stephan Doyle, Manchester, IA (US)

(73) Assignee: Bull Moose Heavy Haul, Inc., Chesterfield, MO (US)

( * ) Notice: Subject to any disclaimer, the term of this patent is extended or adjusted under 35 U.S.C. 154(b) by 18 days.

(21) Appl. No.: 14/033,164

(22) Filed: Sep. 20, 2013

(65) Prior Publication Data

US 2015/0084314 A1    Mar. 26, 2015

(51) Int. Cl.
*B62D 21/14* (2006.01)
*B62D 21/20* (2006.01)

(52) U.S. Cl.
CPC ............... *B62D 21/14* (2013.01); *B62D 21/20* (2013.01); *Y10T 29/49622* (2015.01)

(58) Field of Classification Search
CPC ........ B62D 21/02; B62D 21/04; B62D 21/12; B62D 21/14; E04C 3/005; E04C 3/02; E04C 2003/0404; E04C 2003/0408; E04C 2003/0413; E04C 2003/043
USPC ........ 280/656, 423.1, 400, 402, 415.1, 418.1, 280/781, 785, 796, 797, 800; 180/311; 296/187.01, 203.1, 205; 52/836, 837, 52/838, 839, 844, 845
See application file for complete search history.

(56) References Cited

U.S. PATENT DOCUMENTS

| 1,980,015 | A | | 11/1934 | Thompson |
| 2,150,701 | A | | 3/1939 | Reid |
| 2,900,198 | A | | 8/1959 | Patton |
| 3,165,336 | A | | 1/1965 | Bigge |
| 3,224,154 | A | * | 12/1965 | Toti ........................... E04C 3/07 52/14 |
| 3,371,801 | A | | 3/1968 | Widegren |
| 3,494,657 | A | | 2/1970 | Harper et al. |
| 4,049,143 | A | | 9/1977 | Hatakka et al. |
| 4,103,931 | A | | 8/1978 | Weiss |
| 4,240,647 | A | * | 12/1980 | Lewis .................... B60D 1/155 280/404 |
| 4,397,476 | A | * | 8/1983 | Bolyard et al. ...... B62D 63/061 280/149.2 |
| 4,470,229 | A | | 9/1984 | Muse et al. |
| 4,544,071 | A | | 10/1985 | Poock et al. |
| 4,575,976 | A | | 3/1986 | McDermott et al. |

(Continued)

FOREIGN PATENT DOCUMENTS

DE        2028826     2/1983
DE        4210454     2/1995

(Continued)

OTHER PUBLICATIONS

Engineering Drawings of "BladeMate Extendible Trailer" by XL Specialized Trailers, Sold Jul. 22, 2009, 8 pages.

*Primary Examiner* — John Walters
(74) *Attorney, Agent, or Firm* — Pauly, DeVries Smith & Deffner LLC

(57) ABSTRACT

Embodiments include a support member for an extendable trailer with one or more flange members and one or more web members. In an embodiment, the web members include tabs and the flange members define slots. Other embodiments are also included herein.

15 Claims, 16 Drawing Sheets

(56) References Cited

U.S. PATENT DOCUMENTS

| | | | |
|---|---|---|---|
| 4,582,333 A | 4/1986 | Doering | |
| 4,690,290 A | 9/1987 | Gustafsson | |
| 4,789,120 A | 12/1988 | Spidel | |
| 4,809,472 A | 3/1989 | Hade, Jr. et al. | |
| 5,137,297 A | 8/1992 | Walker | |
| 5,168,679 A | 12/1992 | Featherstone | |
| 5,244,346 A | 9/1993 | Fergusson | |
| 5,249,823 A * | 10/1993 | McCoy | B62B 3/02 280/144 |
| 5,443,131 A | 8/1995 | Bartlett et al. | |
| 5,653,459 A | 8/1997 | Murphy | |
| 5,718,345 A | 2/1998 | Hade | |
| 6,182,995 B1 | 2/2001 | Wall | |
| 6,991,250 B2 | 1/2006 | Lindsey et al. | |
| 7,614,635 B2 | 11/2009 | Pelligrino | |
| RE41,126 E | 2/2010 | Hurlburt | |
| 7,717,498 B2 * | 5/2010 | Fleming | B62D 21/02 280/781 |
| 7,874,568 B1 | 1/2011 | Pelligrino | |
| 8,465,047 B2 * | 6/2013 | Groeneweg | E01F 15/148 280/404 |
| 2010/0109309 A1 * | 5/2010 | Kootstra | B62D 21/04 280/786 |

FOREIGN PATENT DOCUMENTS

| | | |
|---|---|---|
| FR | 2553396 | 2/1986 |
| FR | 2580237 | 10/1986 |
| GB | 100645 | 10/1916 |
| GB | 2209507 | 9/1991 |
| GB | 2274821 | 11/1995 |

* cited by examiner

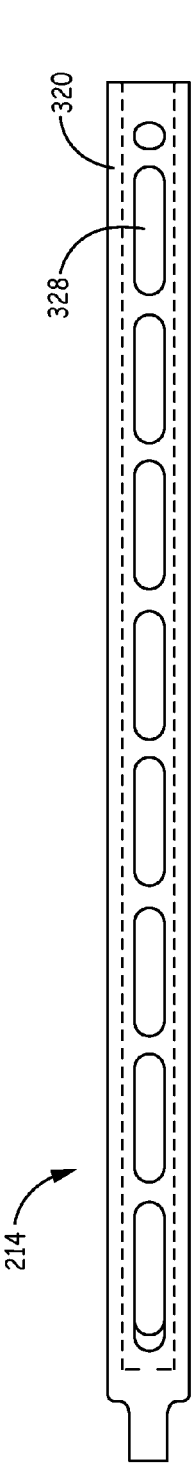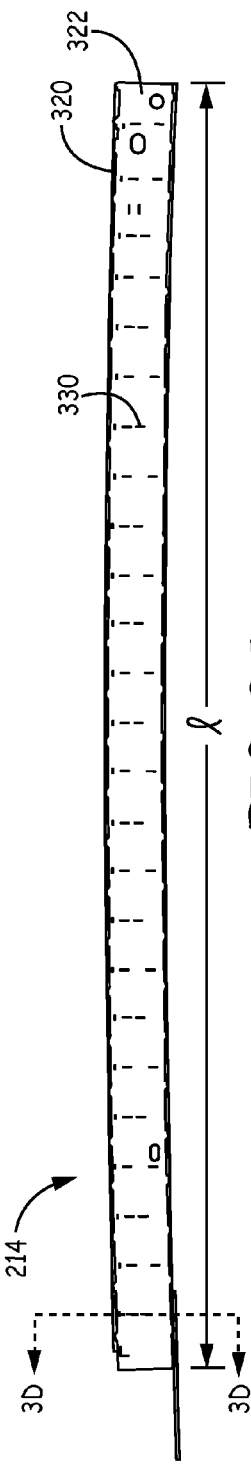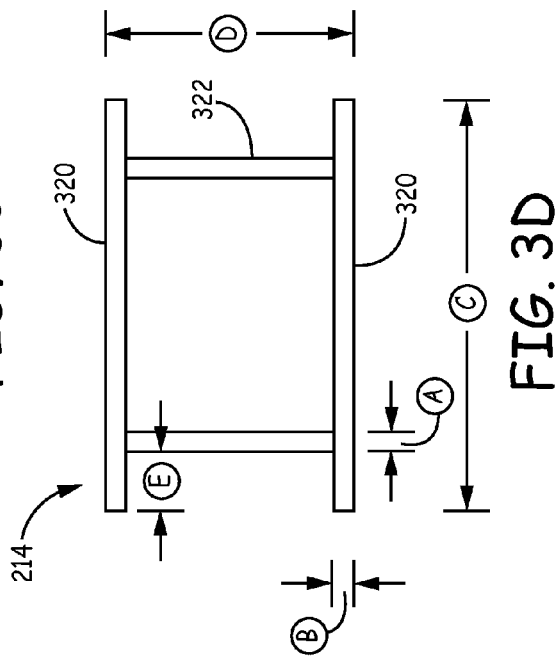

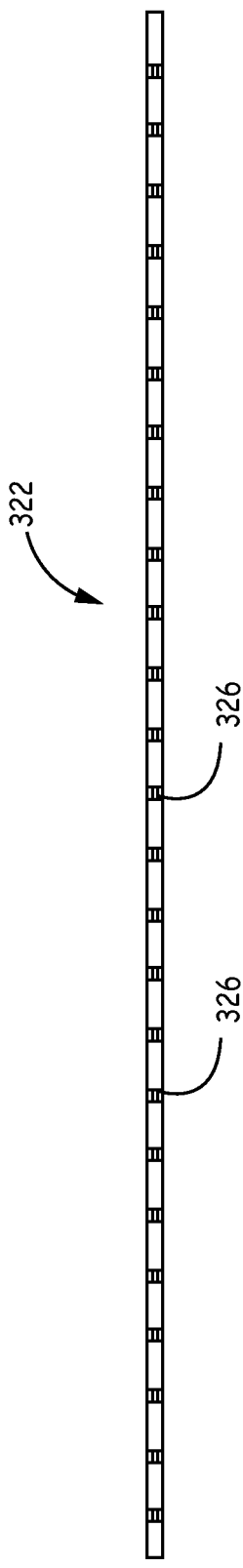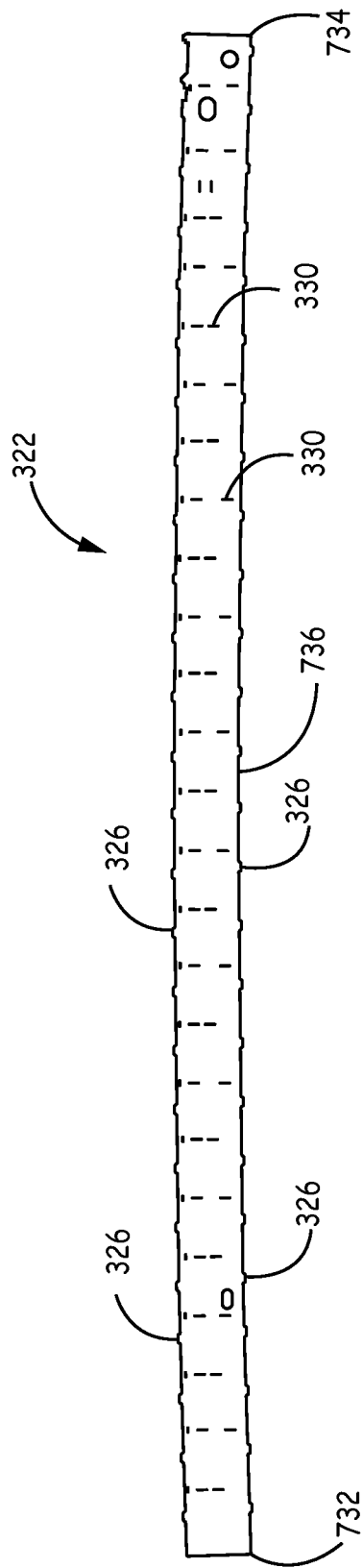

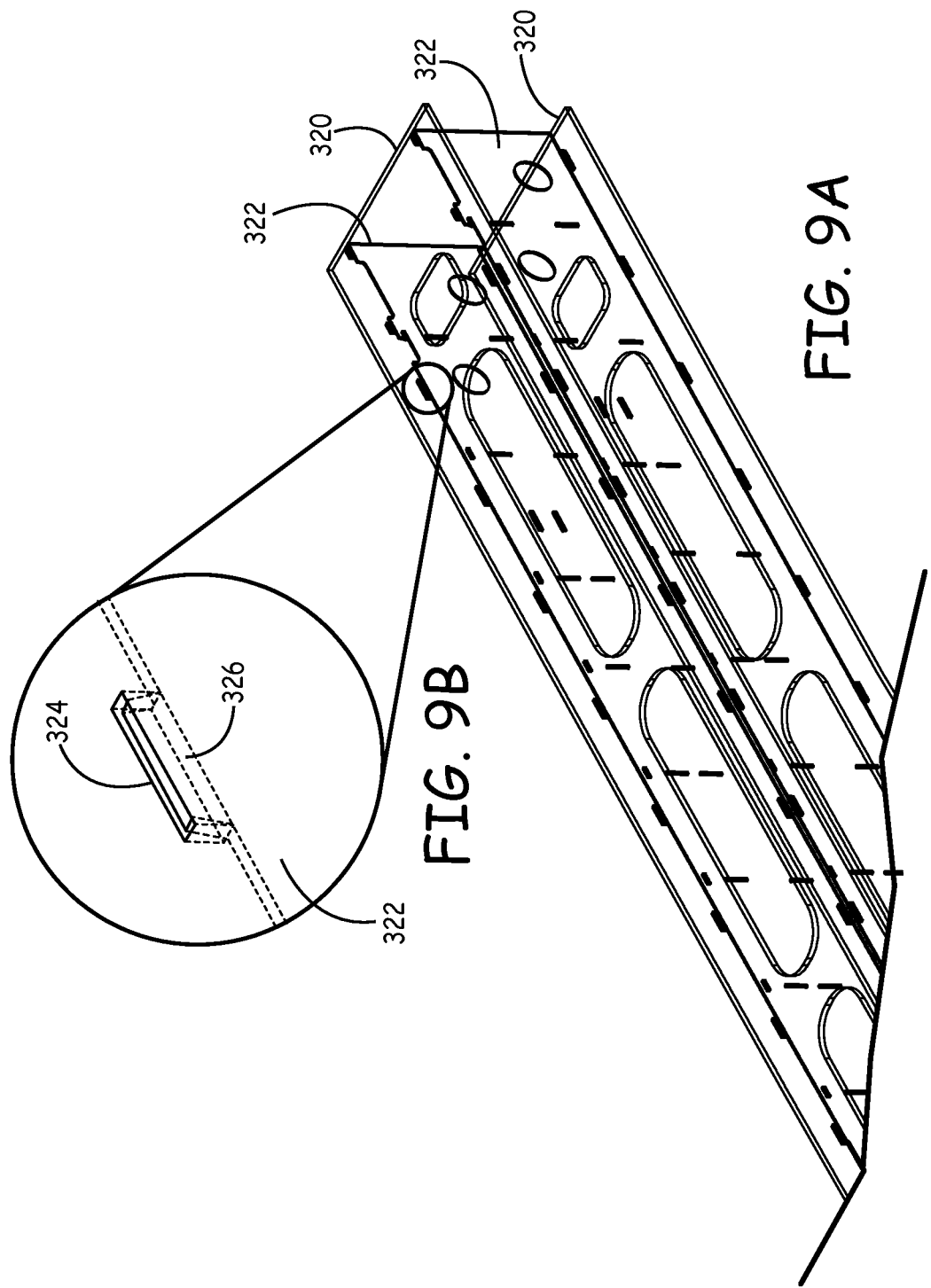

US 9,302,708 B2

SUPPORT MEMBER FOR A TRAILER

FIELD

The present invention relates to a support member for a trailer. More specifically, the present invention relates to a support member with tabs and slots for a trailer.

BACKGROUND

Trailers are used to transport products every day throughout the world. In some instances the products that are being transported are very long and cannot be divided into smaller portion for transport. In these cases, longer trailers are needed.

In some scenarios the longer trailers need to be transported without any products on them or with shorter products that do not require the extra length. In these cases a trailer of standard length is more desirable.

In order to meet the needs of both scenarios, extendable trailers have been developed. Extendable trailers frequently include a male deck that can slide relative to a female deck to extend the trailer. A support member of the male deck frequently slides within a support member of the female deck. In order to allow the trailer to extend smoothly and safely, the support member in the decks must be square over their entire lengths. Ensuring the decks are square over their entire lengths can be difficult, time consuming, and expensive. Accordingly, there is a need for the ability to efficiently manufacture support members.

SUMMARY

Embodiments include an elongated quadrilateral support member for an extendable trailer that includes a first arced flange member, a second arced flange member, a first arced web member, and a second arced web member. In an embodiment, the web members can include one or more tabs. In an embodiment, the flange members can define one or more slots. In an embodiment, the tabs are at least partially disposed within the slots.

An embodiment includes the first arced flange member is parallel with the second arced flange member.

In an embodiment, the first arced web member is parallel with the second arced web member.

In an embodiment, one or more of the tabs terminate within one or more slots.

In an embodiment the elongated quadrilateral support member is at least 20 feet long.

In an embodiment, one or more tabs are sloped.

In an embodiment, the one or more slots are at least 1/16 inches larger than the one or more tabs.

In an embodiment, the first arced flange member and the second arced flange member are perpendicular to the first arced web member and the second arced web member.

In an embodiment, an elongated quadrilateral support member can be slideably coupled to a second elongated quadrilateral support member.

In an embodiment, the slot is substantially quadrilateral.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which:

FIG. 3B is a top view of the support member of FIG. 3A, according to an embodiment.

FIG. 3C is a side view of the support member of FIG. 3A, according to an embodiment.

FIG. 3D is an end view of the support member of FIG. 3A, according to an embodiment.

FIG. 7A is a top view of a web member, according to an embodiment.

FIG. 7B is a side view of a web member, according to an embodiment.

FIG. 9A is a perspective view of a portion of a support member, according to an embodiment.

FIG. 9B is a close-up perspective view of Portion A of the support member of FIG. 9A, according to an embodiment.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 1:
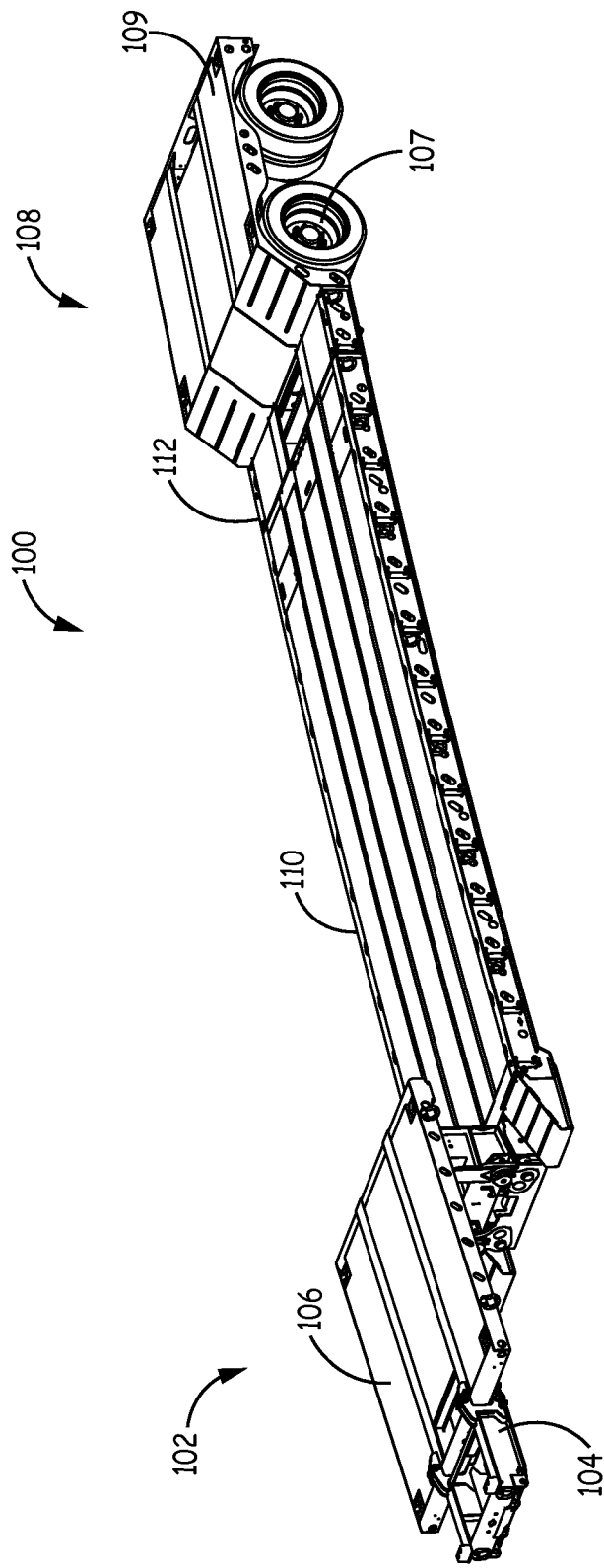
FIG. 1 is a perspective view of a trailer.
Figure 2:
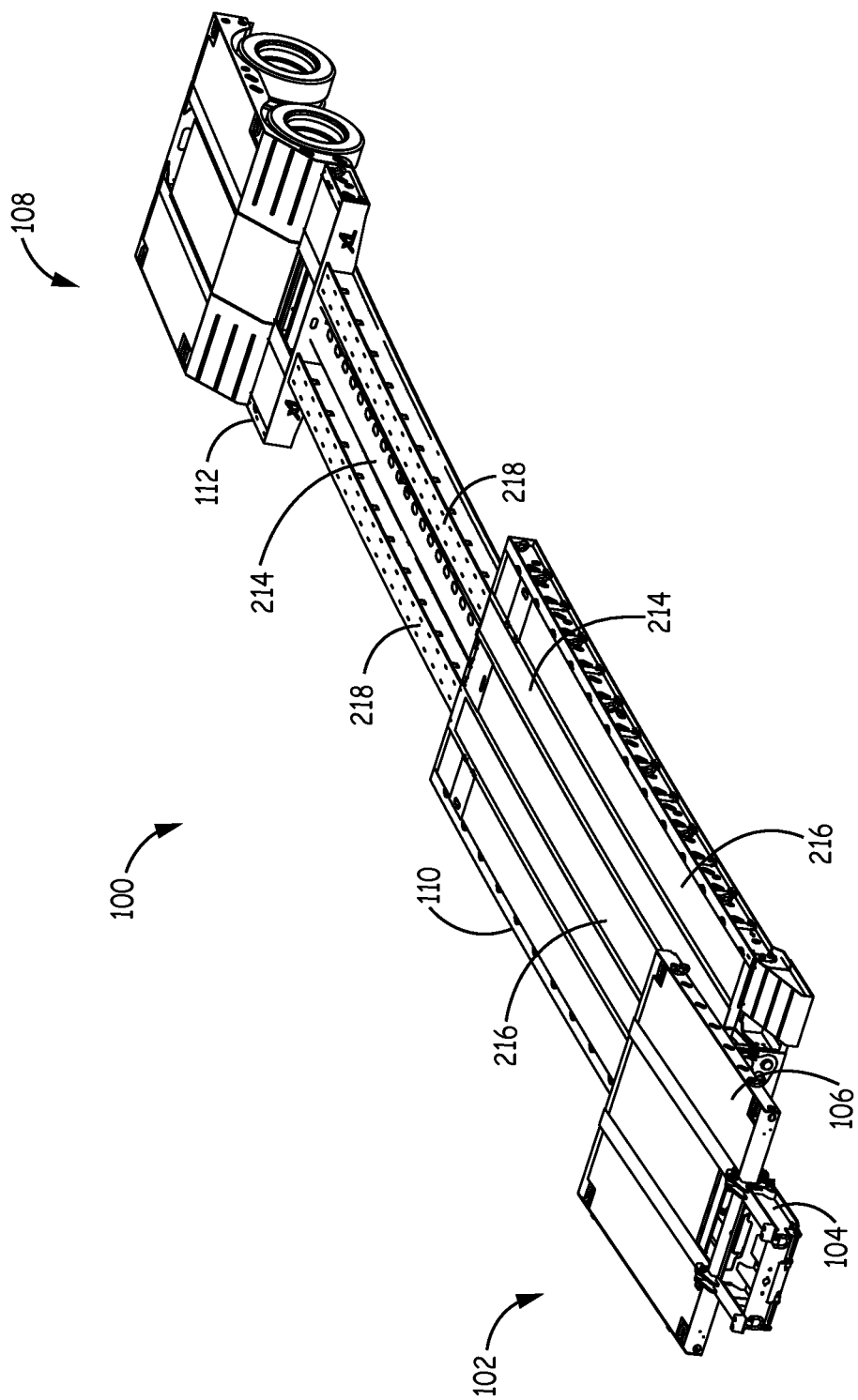
FIG. 2 is a perspective view of the trailer of FIG. 1 in an extended configuration.

FIG. 1 and FIG. 2 show perspective views of a trailer 100. The trailer 100 can include a neck portion 102. The neck portion 102 can include a flip neck 104 or a gooseneck 106. In an embodiment, the flip neck 104 can couple the trailer 100 to a truck with three rear axles. In an embodiment, the gooseneck 106 can couple the trailer 100 to a truck. The neck portion 102 can be configured to couple the trailer 100 to a vehicle, such as a truck in order for the trailer 100 to be transported or for products on the trailer 100 to be transported. The trailer 100 can include an axle area 108. The axle area 108 can include one or more axles and one or more tires 107, such as to aid in transportation of the trailer. A rear deck 109 may be provided in the axle area 108 above the axles and tires 107. The trailer 100 can also include a female deck 110 and a male deck 112. In one embodiment, each deck 109, 110, 112 includes a substantially planar surface for supporting a load.

The female deck 110 and the male deck 112 can allow the trailer 100 to be extendable, such that the male deck 112 can slide with respect to the female deck 110. The trailer 100 can be extendable, for example, the trailer 100 can go from a collapsed position (as shown in FIG. 1) to an extended position (as shown in FIG. 2). In a collapsed position the trailer 100 can have an overall length less than the overall length when the trailer 100 is in an extended position. In some instances a trailer 100 can be used to transport long loads that require a trailer 100 that is longer than a standard trailer. However, the same trailer 100 that is used to transport long loads, might also be used to transport shorter loads, or no load, and in these cases a standard length trailer would be sufficient. The trailer 100 that can transition from a collapsed position to an extended position can be used in both scenarios.

In an embodiment, the trailer 100 can have a length of at least 20 feet in a collapsed position. In an embodiment, the trailer 100 can have a length of no more than 55 feet in a collapsed position. In an extended position, the trailer 100 can have a length of at least 40 feet. In an extended position, the trailer 100 can have a length of no more than 95 feet. The trailer 100 can have a width of at least 6 feet in one embodiment. The trailer 100 can have a width of no more than 12 feet in one embodiment. In an embodiment the trailer 100 can have a width of at least 8.5 feet. In an embodiment, the trailer can have a width of no more than 13 feet. The trailer 100 can have varying widths along the length of the trailer 100. In an embodiment, the widest portion of the trailer can be no more than 13 feet.

The trailer 100 can include two or more support members 214. In an embodiment, the female deck 110 can include one or more female support members 216 and the male deck 112 can include one or more male support members 218. In an embodiment, the female deck 110 can include the same number of female support members 216 as male support members 218 included in the male deck 112. In the embodiment of FIGS. 1-2, the trailer 100 includes two female support members 216 and two male support members 218. It is understood that other numbers of female support member 216 and male support members 218 are possible, for example, one, three, or four. The female support members 216 can be parallel with one another. Similarly, the male support member 218 can be parallel with one another.

Figure 3A:
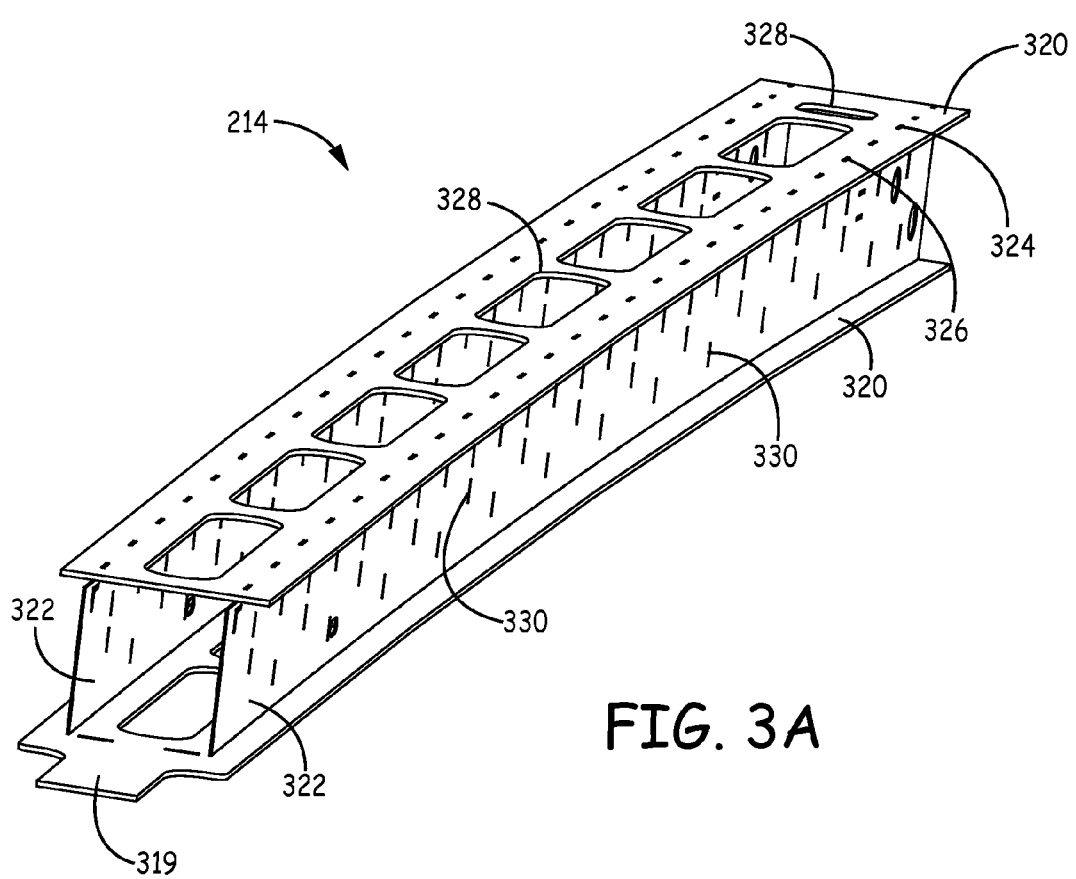
FIG. 3A is a perspective view of a support member, according to an embodiment.

FIG. 3A shows a perspective view of a support member 214, according to an embodiment. In an embodiment, the support member 214 in FIG. 3A can be representative of a female support member, such as in FIG. 5 and FIG. 6. Generally, support member 214 can represent a female support member 216 or a male support member 218. FIG. 3B shows a top view of a support member 214. FIG. 3C shows a side view of a support member 214, and FIG. 3D shows an end view of a support member 214.

Figure 5:
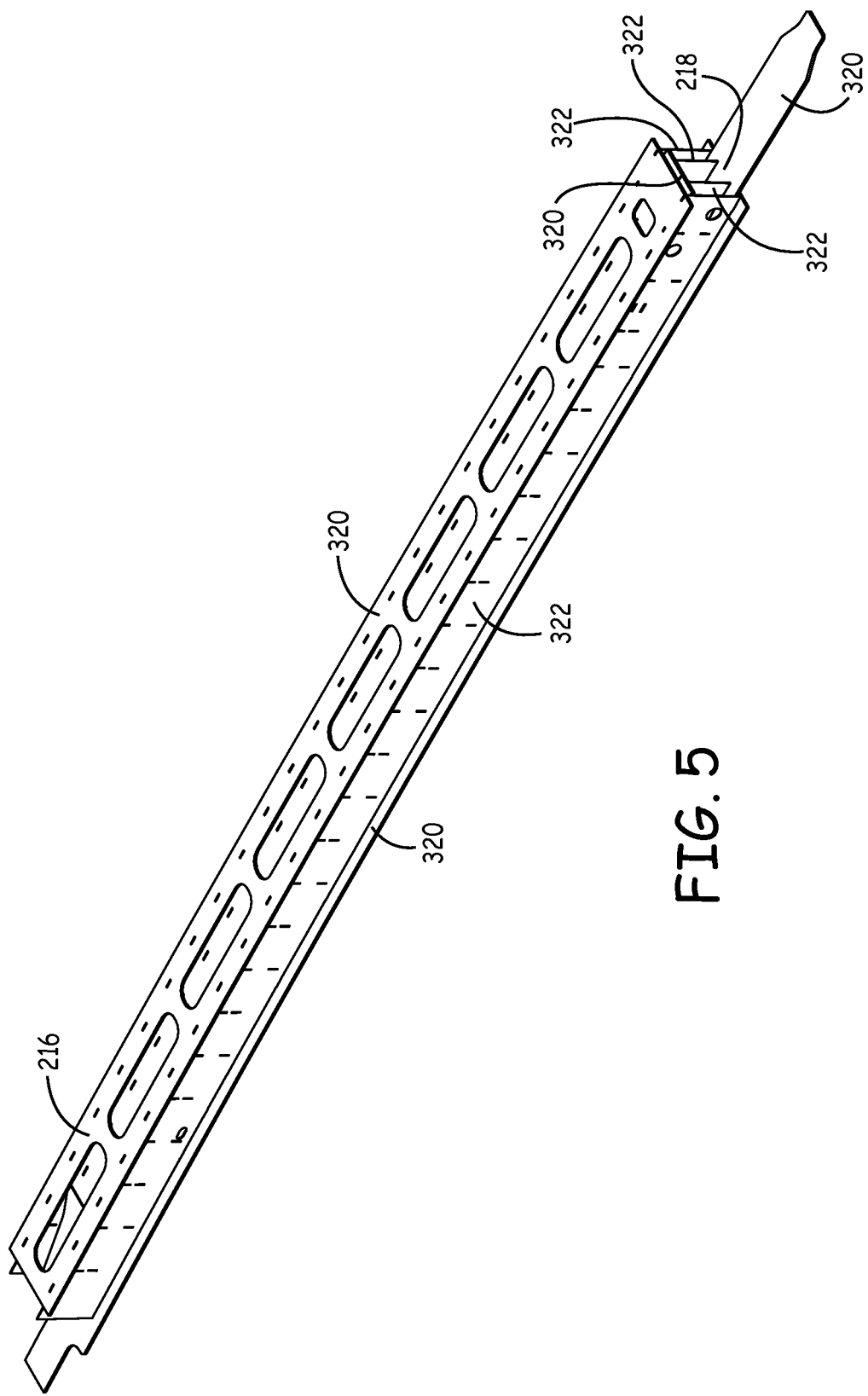
FIG. 5 is a perspective view of a male support member positioned within a female support member, according to an embodiment.
Figure 6:
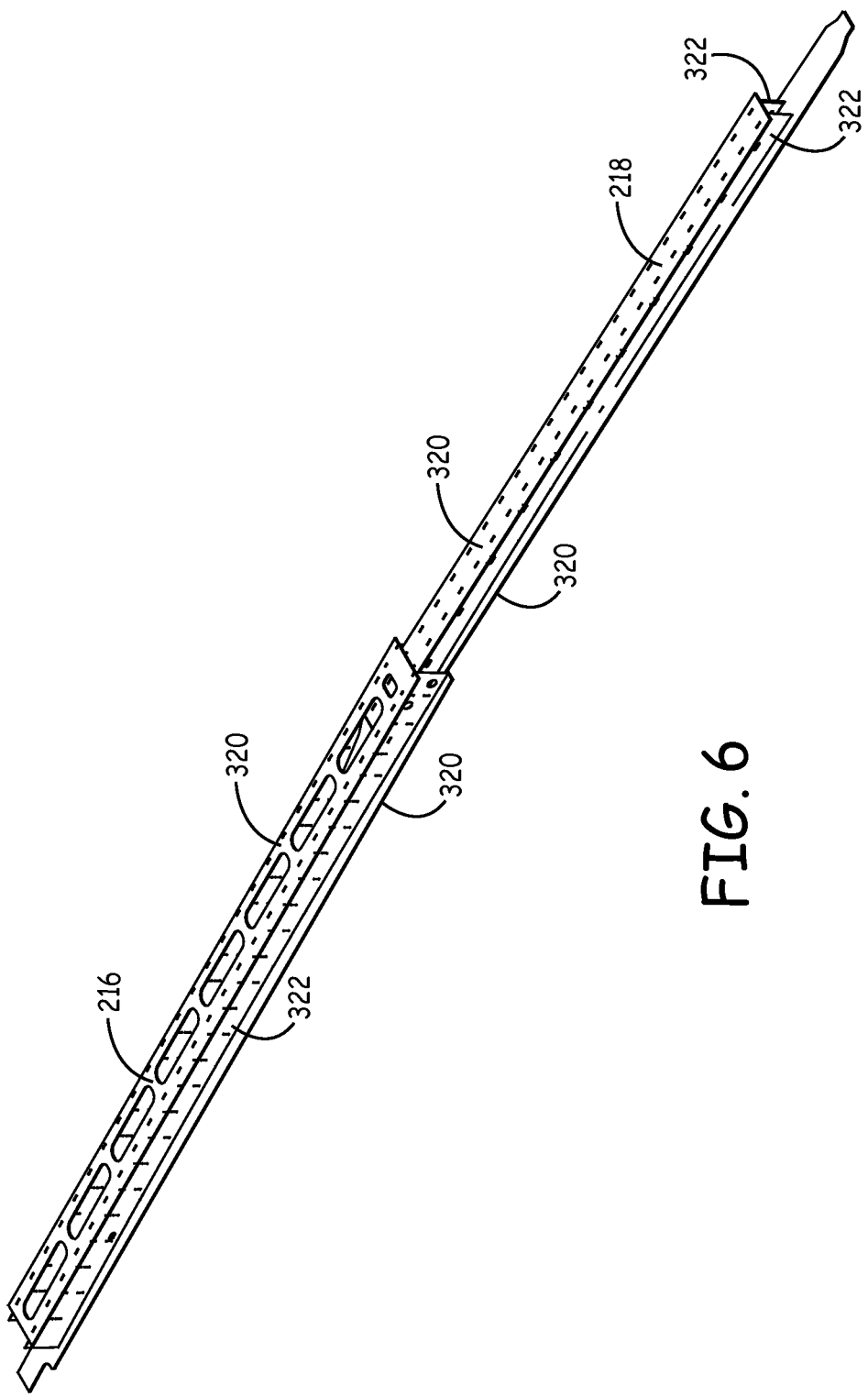
FIG. 6 is a perspective view of the male support member of FIG. 5 positioned partially within the female support member of FIG. 5, according to an embodiment.

The support member 214 can be an elongated quadrilateral. In an embodiment, the support member 214 can be generally rectangular shaped. The support member 214 can be an elongated square, rectangle, or rhombus. Other shapes are also possible. The support member 214 can include a connection tab 319, such as for mounting the support member 214 to the rest of the trailer 100. As can be seen in FIG. 5 and FIG. 6, the female support member 216 can include a different shaped connection tab 319 as the male support member 218. In an embodiment, the female support member 216 and the male support member 218 can include similarly shaped connection tabs 319.

The support member 214 can be elongated, such as having a length larger than its width or height. For example, the support member 214 has a length 5 times as large as its width or height in one embodiment. The support member 214 has a length 10 or 20 times as large as its width or height in other embodiments. The support member 214 can have a height of at least 10 inches or 12 inches in some embodiments. The support member 214 can have a height of no more than 28 inches or no more than 26 inches in some embodiments. The support member 214 can have a width of at least 6 inches, 10 inches or 12 inches in some embodiments. The support member 214 can have a width of no more than 28 inches or 26 inches in some embodiments. The support member can have a length of at least 20 feet or 26 feet in some embodiments. The support member can have a length of no more than 40 feet or no more than 29 feet in some embodiments.

In an embodiment, the support member 214 can have a length of at least 26 feet and no more than 29 feet. In an embodiment, the support member 214 can have a height of at least 12 inches and no more than 26 inches. In an embodiment, the support member can have a width of at least 12 inches and no more than 26 inches.

The support member 214 can include one or more flange members 320 and one or more web members 322. The flange members 320 can define the top and bottom surfaces of the support member 214. The web members 322 can define the sides of the support member 214. In an embodiment, the web members 322 can define the top and bottom surfaces of the support member 214 and the flange members 320 can define the sides of the support members.

In an embodiment, a support member 214 can include two flange members 320 and two web members 322 (as shown in FIG. 3A). The flange member 320 can define a plurality of slots 324. The web member 322 can include a plurality of tabs 326. The web member 322 and the flange member 320 can be configured such that the tabs 326 are at least partially disposed within the slots 324. Disposing the tabs 326 at least partially within the slots 324 can aid in aligning the web member 322 with the flange member 320 in their desired configuration. The web members and flange members are configured so that the tabs 326 and corresponding slots 324 are spaced out along the length of the support member. In one embodiment, the tabs 326 and slots 324 are evenly spaced along the length of the support member. In an embodiment, the web member 322 can define a plurality of slots. In an embodiment, the flange member 320 can include a plurality of tabs.

The flange member 320 can define one or more holes 328. The holes 328 can allow drainage from within the support member 214. Further, the holes 328 can decrease the weight of the support member 214 compared to a support member 214 that did not define any holes. In one embodiment, the holes 328 are evenly spaced along the length of the flange member 320. In one embodiment, the holes 328 are oval shaped. In one embodiment, the holes 328 occupy at least about 20% of the total surface area of the flange member 320 before the holes are cut. In one embodiment, the holes occupy at least about 20% of the area within the outer perimeter of the flange member 320. In various embodiments, the holes occupy at most about 60% or at most about 75% of the area within the outer perimeter of the flange member 320. In various embodiments, the holes occupy about 10%, 20% 30%, 40%, 50% or other portions of the area within the outer perimeter of the flange member 320.

The web member 322 can define one or more cross member apertures 330. The cross member apertures 330 can be configured such that a cross member can be disposed through a cross member aperture 330 in a first web member 322 and through a cross member aperture 330 in a second web member 322. Cross members can provide support for the support member 214, such as within the assembled trailer and during assembly of the support member 214. In an embodiment, the cross members can be welded to a support member 214 and to an outer beam, to provide attachment of the support member 214 to the rest of the trailer 100. In an embodiment, one or more cross members are welded to a first support member 214 and to a second support member 214, such as to provide attachment of the support members 214 to the trailer 100.

In an embodiment, the web member 322 can be perpendicular with the flange member 324. In an embodiment of a support member 214 that includes two flange members 320, the flange members 320 can be parallel. In an embodiment of a support member 214 that includes two web members 322, the web members 322 can be parallel.

As can be seen in FIG. 3C, the support member 214 can be arced, such as to be nonlinear along its length. The support member 214 can be arced, such that when a load is placed on the trailer, the support member 214 deflects into a substantially linear configuration. In a substantially linear configuration the support member 214 can be substantially parallel with a roadway surface in which the trailer can be on.

FIG. 3D shows a cross-section of the support member 214. The thickness of a web member is shown in FIG. 3D by dimension "A". The thickness of a flange member is shown in FIG. 3D by dimension "B". The width of a support member is shown in FIG. 3D by dimension "C". The height of a support member is shown in FIG. 3D by dimension "D". The web members 322 can be inset from the outer edge of the flange members 320. The inset is shown in FIG. 3D by dimension "E". In an embodiment, the inset can be 2⅞ inches. In an embodiment, the inset can be at least 1 inch. In an embodiment, the inset can be no more than 5 inches. FIG. 3D illustrates that the flange members 320 are perpendicular to the web members 322 in the illustrated embodiment.

Figure 4:
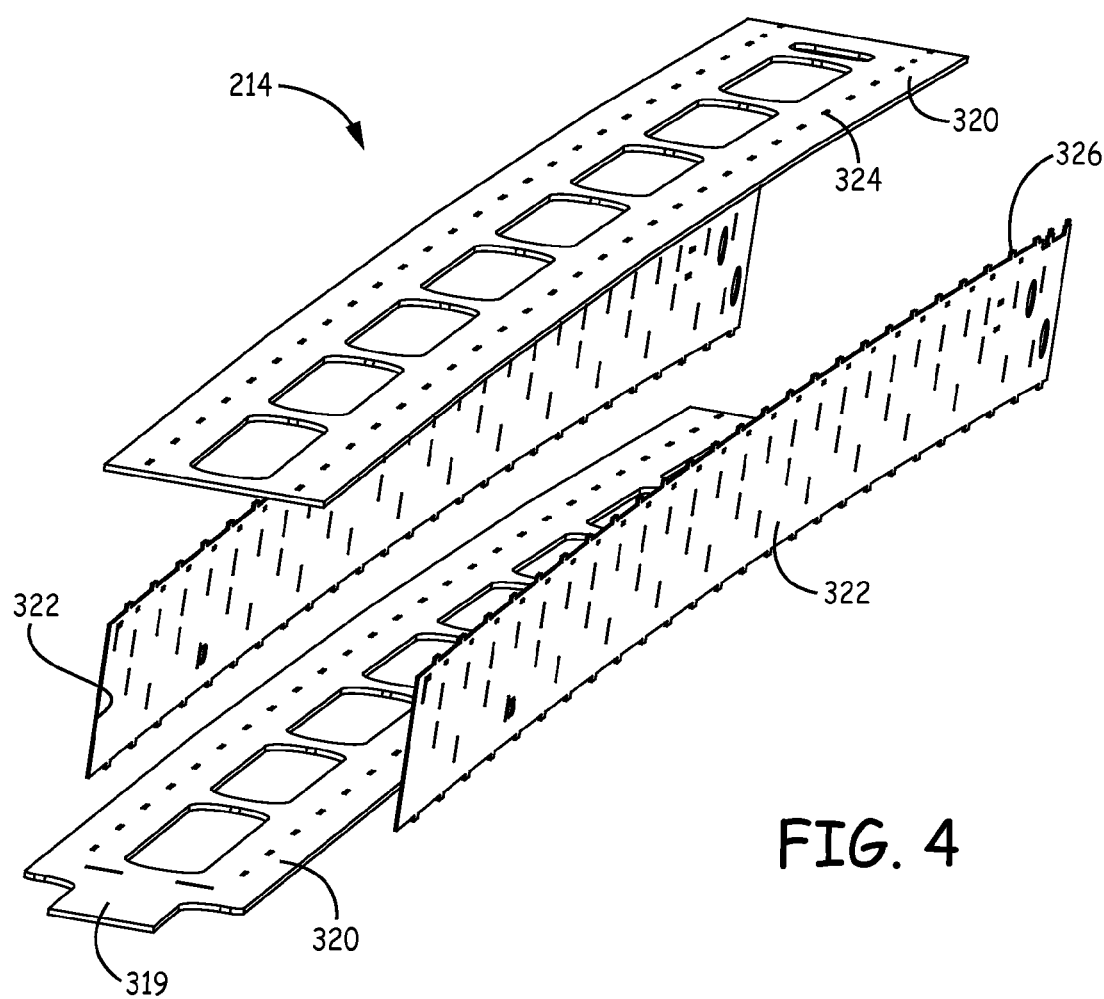
FIG. 4 is an exploded view of the support member of FIG. 3A, according to an embodiment.

FIG. 4 is an exploded view of a support member 214. In an embodiment, there are an equal number of tabs 326 on the web members 322 as there are slots 324 defined by the flange members 320. In an embodiment, each of the tabs 326 on the web members 322 is at least partially disposed within a corresponding slot 324 defined by the flange members 320 when the support member 214 is assembled.

The flange members 320 can be formed by plasma cutting, laser cutting, or water jet cutting. Similarly, the web members 322 can be formed by plasma cutting, laser cutting, or water jet cutting. It will be understood by those skilled in the art that other ways of forming the flange members 320 and web members 322 are possible. In various embodiments, the tolerances can be kept to within 1/16 inches. In an embodiment, the tolerances can be kept within ⅛ inches, ¼ inches, or ½ inches.

In an embodiment, the flange members 320 can include steel or aluminum. In an embodiment, the web members 322 can include steel or aluminum. The flange members 320 and the web members 322 can include other metals as well, either in combination with steel or aluminum, or in place of steel or aluminum.

FIG. 5 shows a female support member 216 and a male support member 218 in a collapsed position. The female support member 216 defines an inner cavity which is large enough to receive the male support member 218, such as to allow the male support member 218 to be at least partially disposed within the female support member 216.

In a collapsed position, the majority of the male support member 218 can be disposed within the female support member 216. FIG. 6 shows a female support member 216 and a male support member 218 in an extended position. In an extended position the majority of the male support member 218 can be disposed external to the female support member 216. It is understood that numerous positions of the male support member 218 relative to the female support member 216 are possible, in addition to the two extremes shown in FIG. 5 and FIG. 6. In an extended position, a portion of the male support member 218 can still be disposed within a portion of the female member 216. The male support member 218 and female support member 216 are configured to prevent the two portions from becoming separated. In an embodiment, there can be stops of the male support member 218 that come into contact with sliding feature, such as to stop male support member 218 from extending from the female support member 216. In an embodiment, about three feet of the male support member 218 is disposed within the female support member 216 in an extended position. In an embodiment, about four feet of the male support member 218 is disposed within the female support member 216 in an extended position.

The female support member 216 can be slideably coupled to the male support member 218, such as to allow the male support member 218 to slide relative to the female support member 216, such as from a collapsed position to an extended position. In an embodiment, the female support member 216 or the male support member 218 can include a sliding feature, such as to decrease the friction when the male support member 216 is being slide relative to the female support member. The sliding feature can include one or more of: a roller, a slide pad, or a lubricant. The roller can include a cylindrical roller, such as a 6 inch diameter roller. The slide pad can include one or more of the following: polymer, Teflon® material, or nylon. The lubricant can include oil or grease.

FIG. 7A shows a top view of a web member 322. Along the top of the web member 322 there can be a plurality of tabs 326. Similarly, there can be a plurality of tabs 326 on the bottom of the web member 322 as well. In an embodiment, the web member 322 can be 3/16 inches thick. In an embodiment, the web member 322 can be about ¼ inches thick. In an embodiment, the web member 322 can be about ⅜ inches thick.

FIG. 7B shows a side view of a web member 322. As can be seen in FIG. 7B, the web member 322 can be arced, such that the ends 732, 734 of the web member 322 are lower (such as not being in the same latitudinal plane) than the middle 736 of the web member 322. A line connecting the corners of the ends 732, 734 would not intersect the middle of the same edge cue to the arc. The tabs 326 can be normal to the web member 322, such that the tabs 326 are consistent with the arc of the web member 322.

Figure 7C:
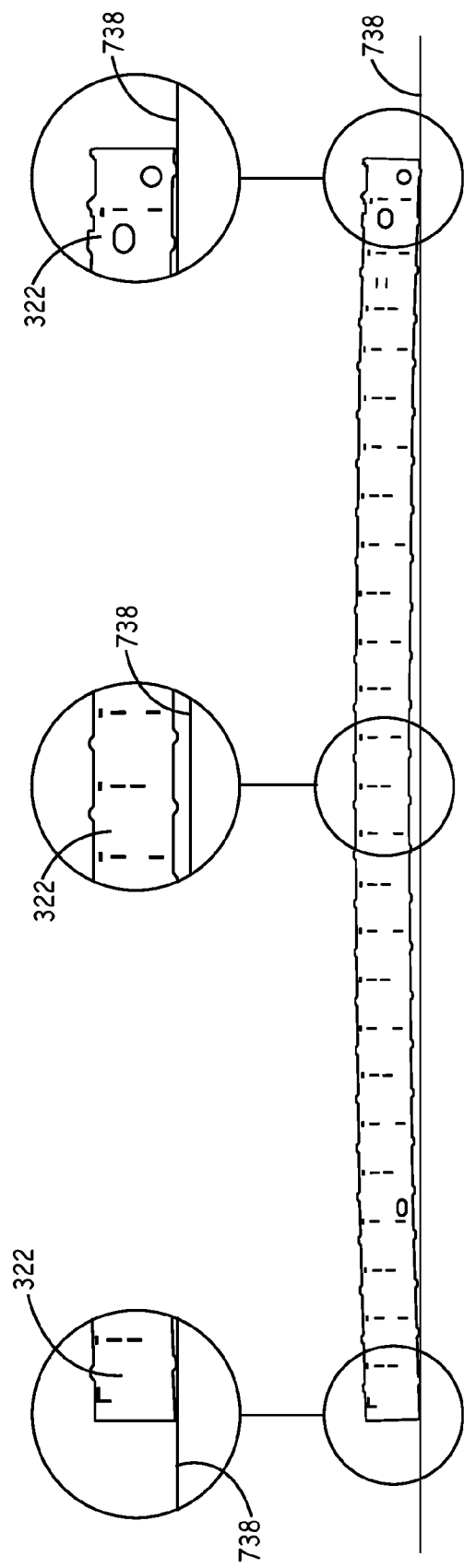
FIG. 7C is a side view of a web member with three close-up portions, according to an embodiment.

FIG. 7C shows a side view of a web member 322 with three close up portions, according to an embodiment. Reference line 738 can be linear. In an embodiment, the web member 322 can be arced such that it contacts reference line 738 on both ends; however between the two ends the web member 322 does not contact the reference line 738. In an embodiment, the middle of the web member 322 is the furthest portion of the web member 322 away from reference line 738.

The magnitude of the arc can be designed to be appropriate to a particular trailer deck length and likely load weight. In one embodiment, the trailer arc is designed such that when a load is placed on the trailer, the support member 214 deflects into a substantially linear configuration. In a substantially linear configuration the support member 214 can be substantially parallel with a roadway surface.

In an embodiment, the support member 214 can be arced, such that the distance between the bottom of the support member 322 and reference line 738 can be more than 0 inches in the middle. In an embodiment, the support member 214 can be linear, such that the distance between the bottom of the web member 322 or the support member 214 and reference line 738 is 0 inches along the length of the web member 322 or the support member 214.

In an embodiment, a 25 foot support member can have a radius of at least 4000 inches. In an embodiment, a 25 foot support member can have a radius of no more than 6500 inches. In an embodiment, a 25 foot support member can have a crown of at least 2 inches. In an embodiment, a 25 foot support member can have a crown of no more than 4 inches. The crown can describe the distance between the bottom of the support member 214 and a linear line, such as reference line 738, at the middle of the support member 214 along the length. For example, a 25 foot support member can have a 4400 inch radius and a 3 inch crown. In another example, a 25 foot support ember can have a 5900 inch radius and 2⅜ inch crown.

In an embodiment, a 29 foot support member can have a radius of at least 4000 inches. In an embodiment, a 29 foot support member can have a radius of no more than 6500 inches. In an embodiment, a 29 foot support member can have a crown of at least 2 inches. In an embodiment, a 29 foot support member can have a crown of no more than 5 inches. For example, a 29 foot support member can have a 4400 inch radius and a 4 inch crown. In another example, a 29 foot support ember can have a 5900 inch radius and 3 inch crown.

In an embodiment, a 33 foot support member can have a radius of at least 4000 inches. In an embodiment, a 33 foot support member can have a radius of no more than 6500 inches. In an embodiment, a 33 foot support member can have a crown of at least 2 inches. In an embodiment, a 33 foot support member can have a crown of no more than 6 inches. For example, a 33 foot support member can have a 4400 inch radius and a 5 inch crown. In another example, a 33 foot support ember can have a 5900 inch radius and 4 inch crown.

In an embodiment, a 37 foot support member can have a radius of at least 8000 inches. In an embodiment, a 37 foot support member can have a radius of no more than 13000 inches. In an embodiment, a 37 foot support member can have a crown of at least 1.5 inches. In an embodiment, a 37 foot support member can have a crown of no more than 4 inches. For example, a 37 foot support member can have a 10500 inch radius and a 2⅜ inch crown.

In an embodiment, a 42 foot support member can have a radius of at least 8000 inches. In an embodiment, a 42 foot support member can have a radius of no more than 13000 inches. In an embodiment, a 42 foot support member can have a crown of at least 2 inches. In an embodiment, a 42 foot support member can have a crown of no more than 5 inches. For example, a 42 foot support member can have a 10500 inch radius and a 3 inch crown.

Figure 8A:
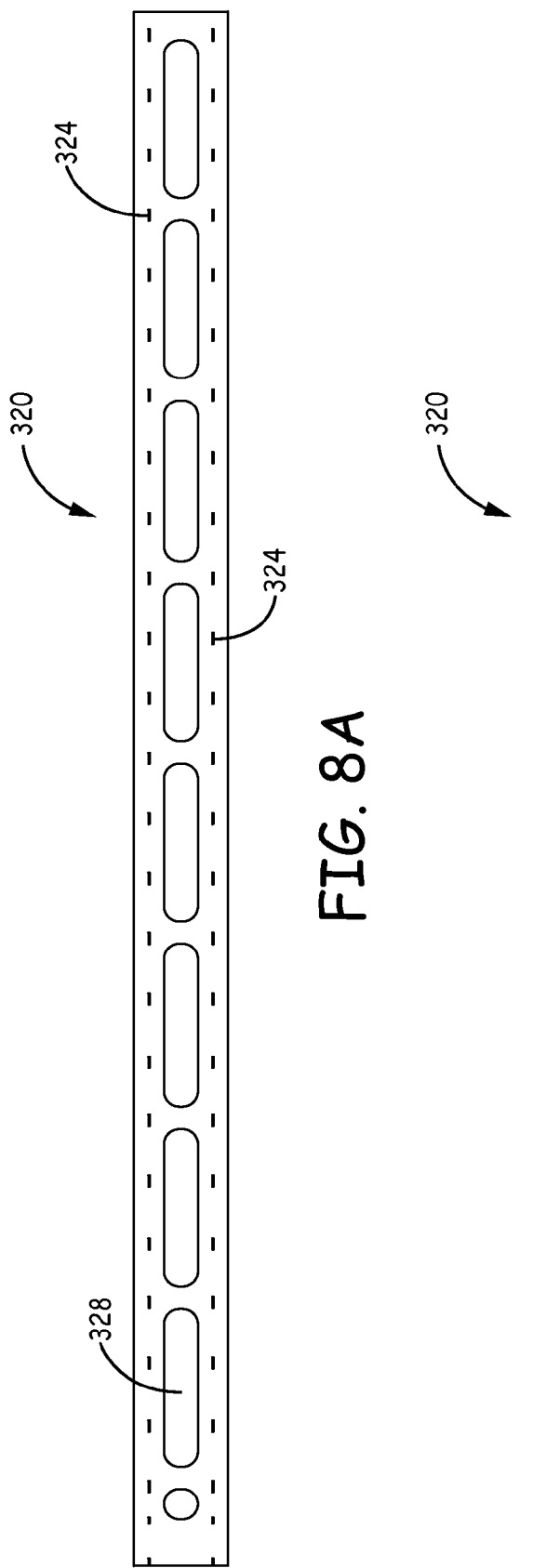
FIG. 8A is a top view of a flange member, according to an embodiment.

FIG. 8A shows a top view of a flange member 320. The flange member 320 can define a plurality of slots 324 that can correspond with a plurality of tabs on a web member 322. The slots 324 can extend through the flange member 320, such as to allow a tab 326 to pass through the flange member 320.

Figure 8B:
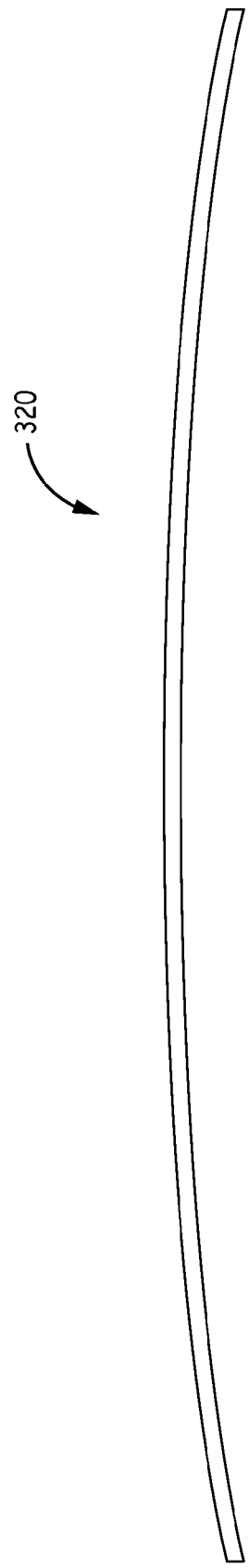
FIG. 8B is a side view of a flange member, according to an embodiment.

FIG. 8B shows a side view of a flange member 320. Similar to the web member in FIG. 7B, the flange member 320 can be arced. The flange member 320 can have a substantially similar arc as the web member 322, such as for the flange member 320 to fit consistently with the web member 322. In an embodiment, the flange member 320 can be ½ inches thick.

FIG. 9A shows a perspective view of a portion of a support member 214 near its end. The two flange members 320 are assembled with two web members 322. FIG. 9B shows a close up view of the slot 324 and tab 326 interaction in of detail portion A of FIG. 9A. The slots 324 are generally sized at least 1/16 inches wider and longer than the tabs 326, such as to allow the tabs to at least partially fit within the slot. In an embodiment, the tabs 326 terminate within the slot, such that the tab 326 does not protrude all the way through the slot 324 in which it is at least partially disposed within. In an embodiment, the remaining space left void by the tab 326 within the slot 324 can be welded, and thereby at least partially filled. FIGS. 9A and 9B show the support member 214 before welding to permanently join the parts.

Figure 10:
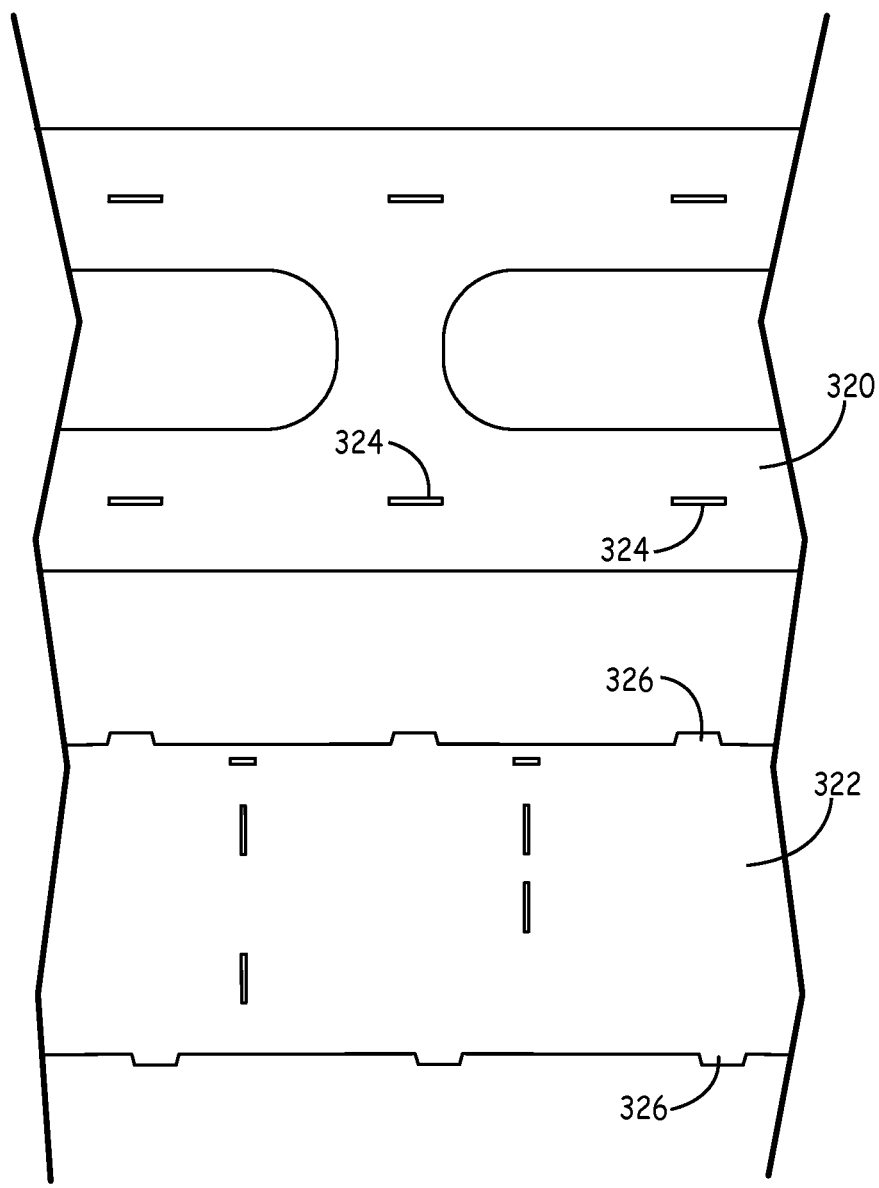
FIG. 10 is an exploded view of a portion of a support member, according to an embodiment.

FIG. 10 shows an exploded view of a portion of a support member 214. In an embodiment, the slots 324 can be substantially rectangular. In an embodiment, the slot 324 can be 2¼ inches long and ¼ inches wide. In an embodiment, the tab 326 can be 2 inches long and 3/16 inches wide.

The tabs 326 can be sloped, such that the portion of the tab 326 furthest away from the web member 322 is smaller than the portion of the tab 326 adjacent to the web member 322. In an embodiment, the edges of the tab 326 can be sloped at 15 degrees from perpendicular on both ends (as shown in FIG. 10). Other degrees of the slope are possible, such as 5, 10, 20, 25, or 30 degrees.

Figure 11:
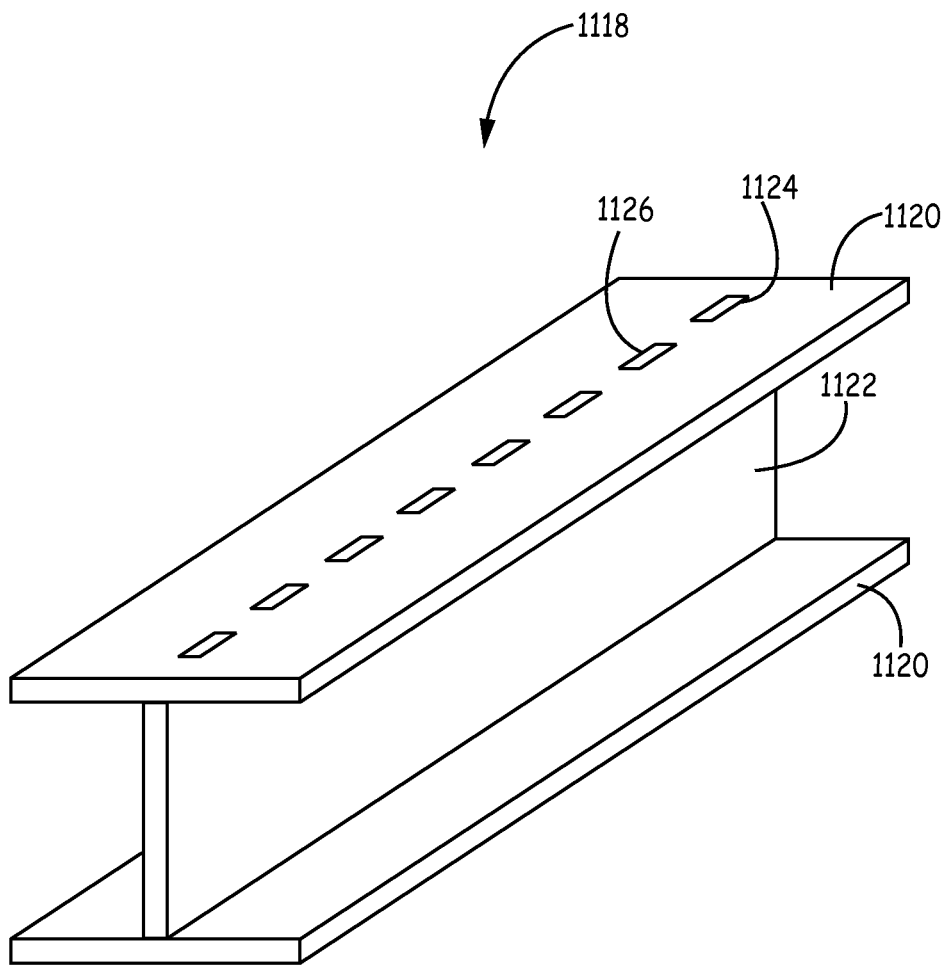
FIG. 11 is a perspective view of a male support member, according to an embodiment.

FIG. 11 shows a perspective view of an alternative male support member 1118, according to an embodiment. The male support member 1118 can include two flange members 1120 and one web member 1122. The flange members 1120 can define a plurality of slots 1124. The web member 1122 can include a plurality of tabs 1126. One or more of the tabs 1126 can be at least partially disposed within one or more of the slots 1124.

Figure 12:
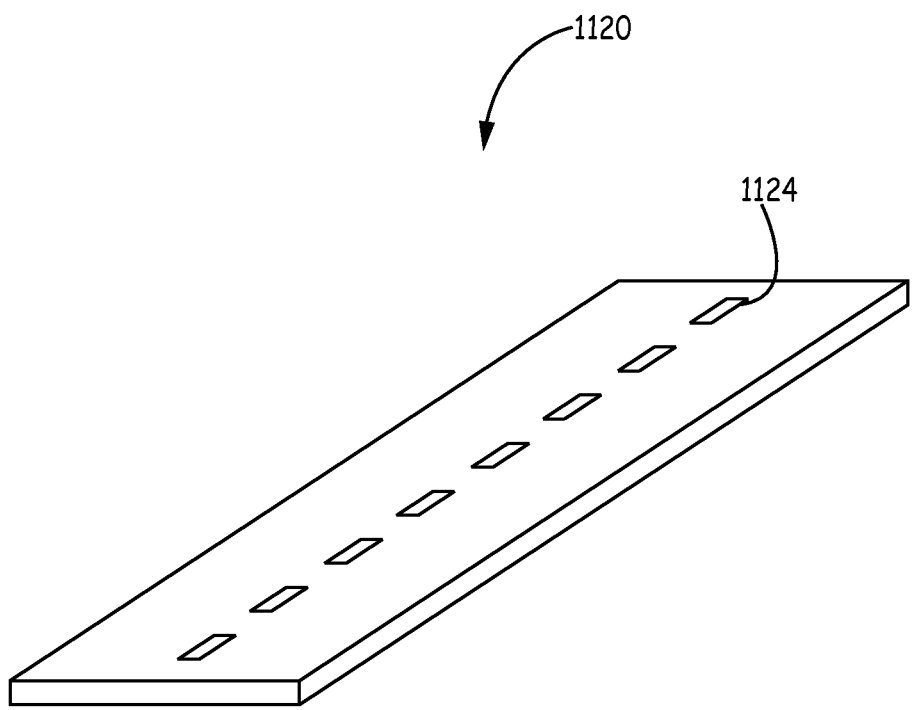
FIG. 12 is a perspective view of a flange member, according to an embodiment.

FIG. 12 shows a perspective view of the flange member 1120, according to an embodiment. In an embodiment, the flange member 1120 can define one row of slots 1124 to correspond with the tabs 1126 of the web member 1122. In an embodiment, the one row of slots 1124 can be substantially in the middle of the flange member 1120.

Figure 13:
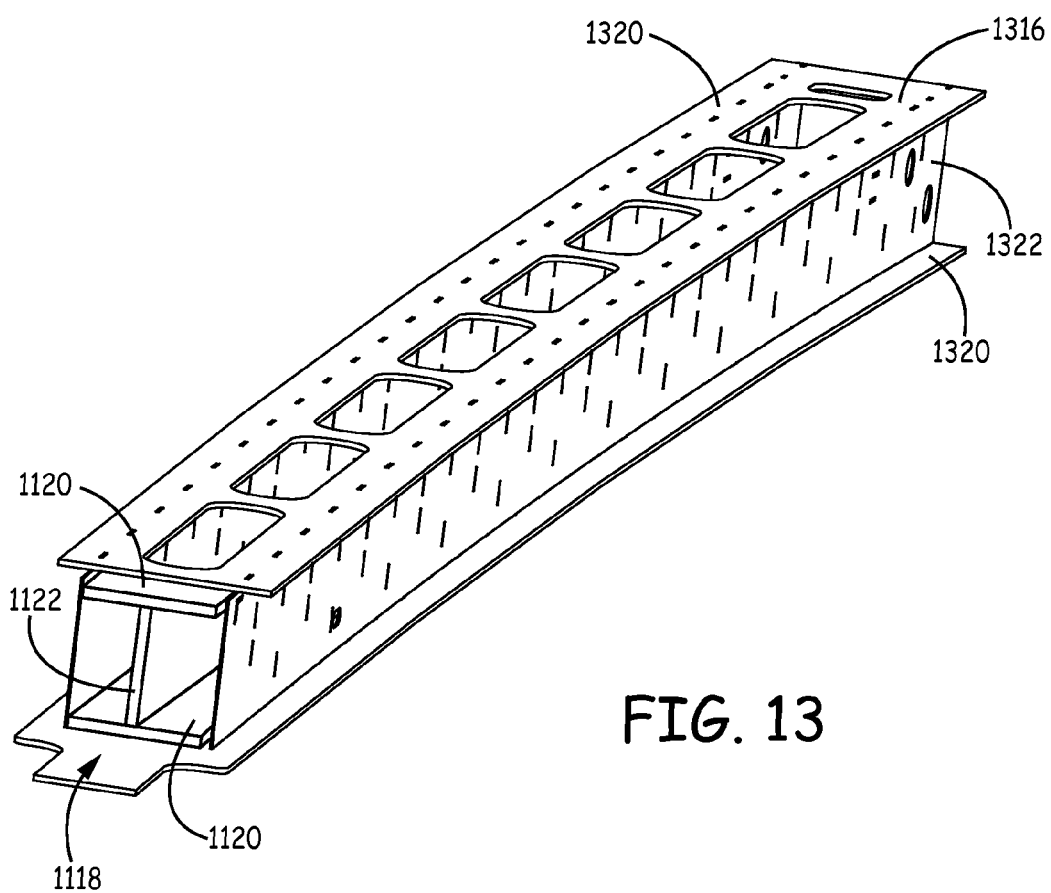
FIG. 13 is a perspective view of a male support member and a female support member, according to an embodiment.

FIG. 13 shows a perspective view of the male support member 1118 of FIG. 11 and a female support member 1316 in a collapsed position. In an embodiment, the male support member 1118 can include two flange members 1120 and one web member 1122, and the female support member can include two flange members 1320 and two web members 1322. The male support member 1118 can be slideably coupled to the female support member 1316, such that the male support member 1118 can slide from a collapsed position (as shown in FIG. 13) to an extended position, and back.

Figure 14:
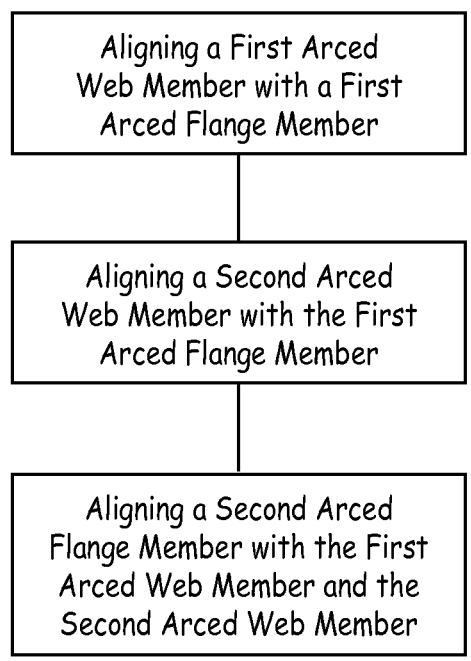
FIG. 14 is a flow chart depicting a method of assembling a support member, according to an embodiment.

FIG. 14 is a flow chart depicting a method of assembling a support member. The support member can be assembled by aligning a first web member with a first flange member. In an embodiment, the first flange member can be placed on a surface, such as a table, in order to be parallel with the ground. In an embodiment, the first flange member is supported above a surface using risers, so that it is possible to access all sides of the flange member. The first web member can be aligned with the first flange member by disposing the tabs on the bottom side of the first web member into slots defined by the first flange member. In an embodiment, the tabs are sufficiently strong and rigid to hold the first web member substantially perpendicular with the first flange member without the use of additional braces or supports. The first web member can be welded to the first flange member.

A second web member can be aligned with the first flange member, by disposing the tabs on the bottom side of the second web member into slots defined by the first flange member. In an embodiment, the tabs are sufficiently strong and rigid to hold the second web member substantially perpendicular with the first flange member without the use of additional braces or supports. The second web member can be substantially parallel with the first web member. The second web member can be welded to the first flange member.

The second flange member can be aligned with the first web member and the second web member by disposing the tabs on the top side of the first web member and the second web member into slots defined by the second flange member. In an embodiment, the tabs are sufficiently strong and rigid to hold the second flange member substantially perpendicular with the first web member and the second web member. In an embodiment, the tabs are sufficiently strong and rigid to hold the second flange member substantially parallel with the first flange member. The second flange member can be welded to the first web member and the second web member.

In an embodiment, the first web member, the second web member, the first flange member, and the second flange member are plasma cut, laser cut, or water jet cut, prior to the start of aligning the components with each other.

In an embodiment, at least a portion of void in the slots left by the tab (being undersized compared to the slot) is filled by welding.

In an embodiment, cross members can be disposed through the web members to aid in keeping the web member parallel with each other or perpendicular with the flange member. In an embodiment, the cross members can be removed after the web members are welded to the flange members.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The invention claimed is:

1. An elongated quadrilateral support member for an extendable trailer, comprising:
    a first arced flange member coupled to a first arced web member and a second arced web member;
    a second arced flange member coupled to the first arced web member and the second arced web member;
    the first arced web member and the second arced web member each comprise a plurality of tabs; and
    the first arced flange member and the second arced flange member each define a plurality of slots;
    wherein one or more tabs of the plurality of tabs are at least partially disposed within one or more slots of the plurality of slots;
    wherein the first arced web member is parallel with the second arced web member.

2. The elongated quadrilateral support member according to claim 1, wherein the first arced flange member is parallel with the second arced flange member.

3. The elongated quadrilateral support member according to claim 1, wherein one or more of the tabs terminate within one or more slots.

4. The elongated quadrilateral support member according to claim 1, wherein the elongated quadrilateral support member is at least 20 feet long.

5. The elongated quadrilateral support member according to claim 1, wherein the one or more tabs of the plurality of tabs have at least one sloped edge.

6. The elongated quadrilateral support member according to claim 1, wherein one or more slots of the plurality of slots are at least 1/16 inches deeper than a height of one or more tabs of the plurality of tabs.

7. The elongated quadrilateral support member according to claim 1, wherein the first arced flange member and the second arced flange member are perpendicular to the first arced web member and the second arced web member.

8. The elongated quadrilateral support member according to claim 1, configured to be slideably coupled to a second elongated quadrilateral support member.

9. The elongated quadrilateral support member according to claim 1, wherein one or more slots of the plurality of slots are substantially quadrilateral.

10. An extendable trailer, comprising:
    a neck configured to couple the extendable trailer to a vehicle;
    the neck coupled to a female deck or a male deck;
    the female deck comprising one or more female support members;
    the female deck slideably coupled to the male deck;
    the male deck comprising one or more male support members;
    the one or more female elongated quadrilateral support members comprise two or more female arced web members and two or more female arced flange members, wherein the female arced web members comprise a plurality of first tabs and the female arced flange members define a plurality of first slots, wherein the female arced web members are coupled to the female arced flange members with one or more first tabs of the plurality of first tabs at least partially disposed into one or more first slots of the plurality of first slots, wherein the female arced web members are parallel with each other; and the one or more male elongated quadrilateral support members comprise two or more male arced web members and two or more male arced flange members, wherein the male arced web members comprise a plurality of second tabs and the male arced flange members define a plurality of second slots, wherein the male arced web members are coupled to the male arced flange members with one or more second tabs of the plurality of second tabs at least partially disposed into one or more second slots of the plurality of second slots, wherein the male arced web members are parallel with each other.

11. The extendable trailer according to claim 10, wherein the female elongated quadrilateral support members comprise one or more first tabs having at least one sloped edge.

12. The extendable trailer according to claim 10, wherein the male elongated quadrilateral support members comprise one or more second tabs having at least one sloped edge.

13. The extendable trailer according to claim 10, wherein the female elongated quadrilateral support member comprises two female arced flange members that are parallel with each other.

14. The extendable trailer according to claim 10, wherein the male elongated quadrilateral support member comprises two male arced flange members that are parallel with each other.

15. A method of assembling an elongated quadrilateral support member for an extendable trailer, comprising:
  aligning a first arced web member with a first arced flange member, wherein the first arced web member comprises a plurality of tabs that are at least partially disposed in a plurality of slots defined by the first arced flange member;
  aligning a second arced web member with the first arced flange member, wherein the second arced web member comprises a plurality of tabs that are at least partially disposed in a plurality of slots defined by the first arced flange member;
  aligning a second arced flange member with the first arced web member and the second arced web member by disposing a plurality of tabs at least partially into a plurality of slots, wherein the first arced web member is parallel with the second arced web member.

* * * * *